US009830101B2

(12) United States Patent
Christ et al.

(10) Patent No.: US 9,830,101 B2
(45) Date of Patent: Nov. 28, 2017

(54) MANAGING DATA STORAGE IN A SET OF STORAGE SYSTEMS USING USAGE COUNTERS

(71) Applicant: International Business Machines Corporation, Armonk, NY (US)

(72) Inventors: Achim Christ, Mainz (DE); Nils Haustein, Mainz (DE); Dominic Mueller-Wicke, Mainz (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 14/453,756

(22) Filed: Aug. 7, 2014

(65) Prior Publication Data
US 2015/0074065 A1 Mar. 12, 2015

(30) Foreign Application Priority Data

Sep. 11, 2013 (GB) .................................. 1316177.3

(51) Int. Cl.
*G06F 17/30* (2006.01)
*G06F 3/06* (2006.01)

(52) U.S. Cl.
CPC ............ *G06F 3/0641* (2013.01); *G06F 3/067* (2013.01); *G06F 3/0608* (2013.01)

(58) Field of Classification Search
CPC ....... G06F 3/0641; G06F 3/067; G06F 3/0608
USPC ......................................................... 707/692
See application file for complete search history.

(56) References Cited

U.S. PATENT DOCUMENTS

| 7,567,188 B1 * | 7/2009 | Anglin .................. G06F 3/0608 341/63 |
| 8,176,246 B1 | 5/2012 | Jernigan, IV et al. |
| 8,190,835 B1 | 5/2012 | Yueh |
| 8,250,325 B2 | 8/2012 | Holdman et al. |

(Continued)

FOREIGN PATENT DOCUMENTS

EP          1244221 A1      9/2002

OTHER PUBLICATIONS

Osuna, Alex, "IBM System Storage N series A-SIS Deduplication", IBM Corporation, IBM Redbooks, http://www.redbooks.ibm.com/redbooks/pdfs/sg247709.pdf, Apr. 2009, 78 pages.

*Primary Examiner* — Tony Mahmoudi
*Assistant Examiner* — Michael Le
(74) *Attorney, Agent, or Firm* — Francis Lammes; Stephen J. Walder, Jr.; Randall J. Bluestone

(57) ABSTRACT

The present invention relates to a method for data access in a storage infrastructure. The storage infrastructure comprises a host system connected to at least a first storage system and a second storage system. The first storage system receives, from the host system, a write request for storing a data chunk, the write request is indicative of a first identifier of the data chunk. The first storage system calculates a hash value of the received data chunk using a hash function. The first storage system determines a first storage location in the first storage system of the data chunk and sends a write message including the hash value, the first identifier and the first storage location to the de-duplication module. The de-duplication module determines whether the hash value exists in the data structure.

20 Claims, 4 Drawing Sheets

(56) References Cited

U.S. PATENT DOCUMENTS

| | | | |
|---|---|---|---|
| 8,280,854 B1* | 10/2012 | Emmert | G06F 17/30221 |
| | | | 707/637 |
| 8,290,972 B1 | 10/2012 | Deshmukh et al. | |
| 8,315,984 B2 | 11/2012 | Frandzel | |
| 8,352,447 B2 | 1/2013 | Hayashi et al. | |
| 8,396,841 B1 | 3/2013 | Janakiraman | |
| 8,401,185 B1 | 3/2013 | Telang | |
| 9,110,914 B1* | 8/2015 | Frank | G06F 17/30156 |
| 2008/0005141 A1* | 1/2008 | Zheng | G06F 3/0608 |
| 2009/0327625 A1* | 12/2009 | Jaquette | G06F 3/0608 |
| | | | 711/160 |
| 2010/0131480 A1* | 5/2010 | Schneider | G06F 17/3015 |
| | | | 707/698 |
| 2010/0281081 A1* | 11/2010 | Stager | G06F 9/5022 |
| | | | 707/814 |
| 2012/0221817 A1 | 8/2012 | Yueh | |
| 2013/0018854 A1 | 1/2013 | Condict | |
| 2013/0238832 A1* | 9/2013 | Dronamraju | G06F 3/0608 |
| | | | 711/103 |
| 2013/0297569 A1 | 11/2013 | Hyde, II et al. | |
| 2015/0006475 A1* | 1/2015 | Guo | G06F 17/30159 |
| | | | 707/609 |

* cited by examiner

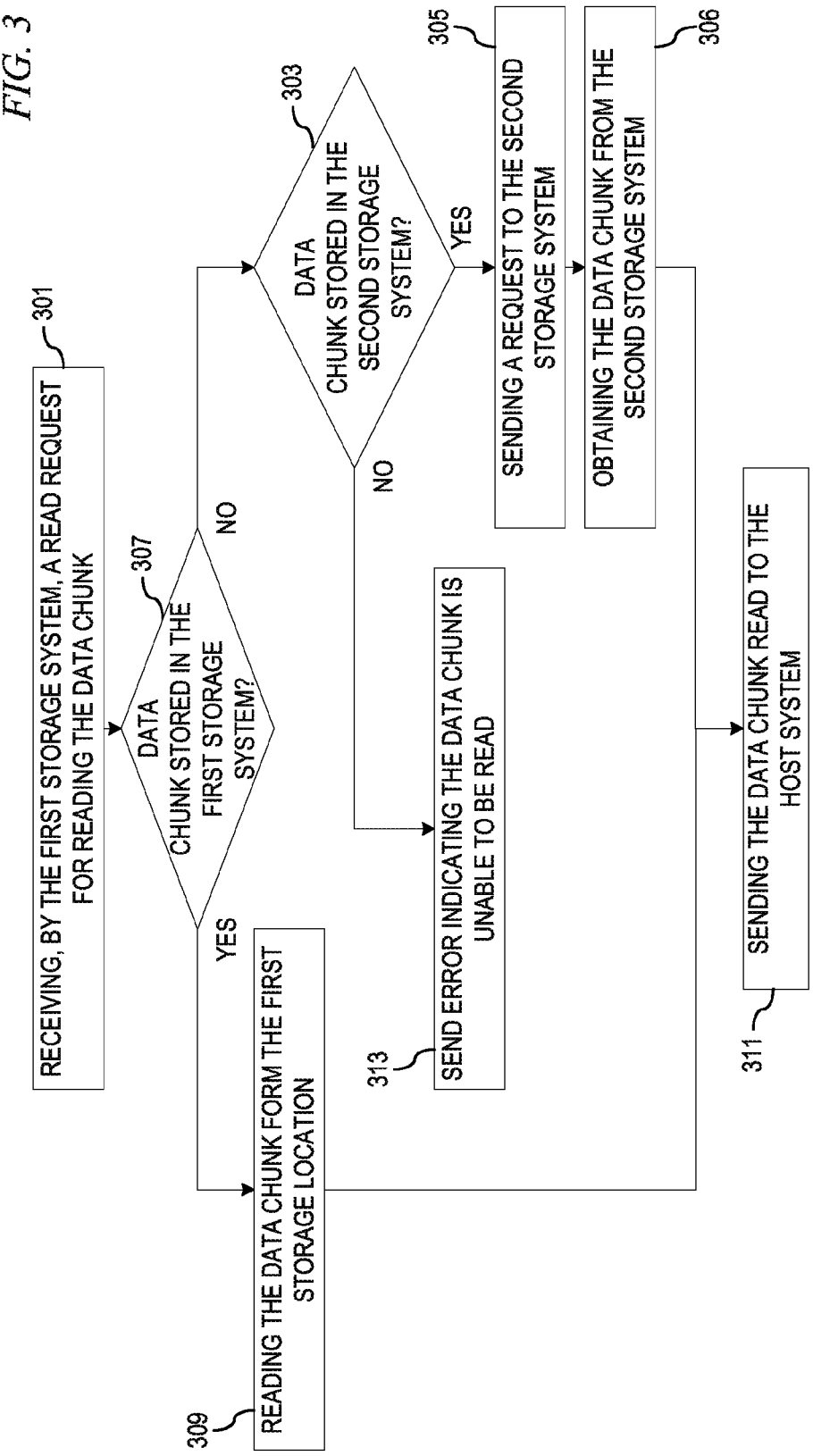

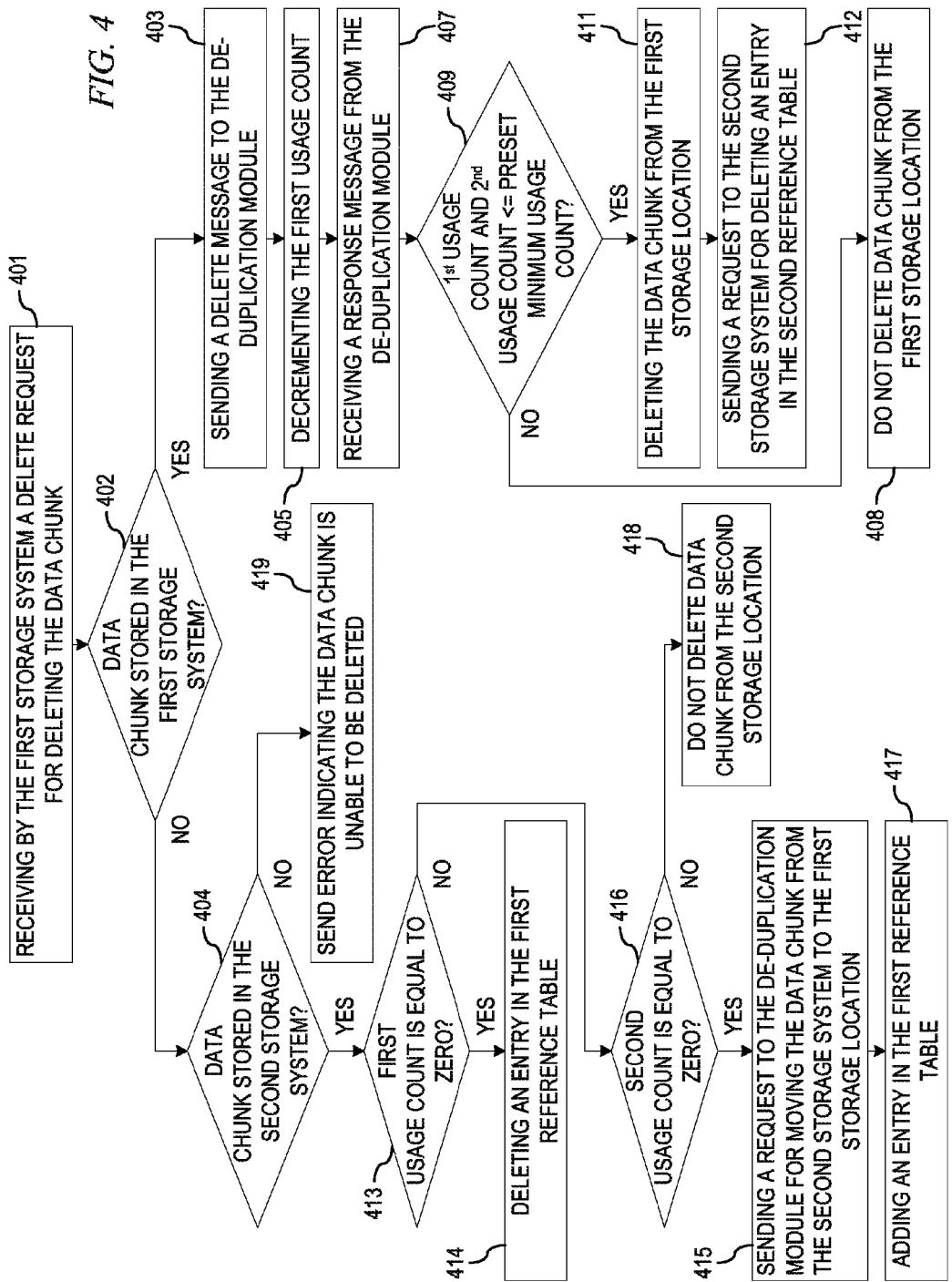

MANAGING DATA STORAGE IN A SET OF STORAGE SYSTEMS USING USAGE COUNTERS

BACKGROUND

The invention relates to computing systems, and more particularly to a method for data access in a storage infrastructure.

Data de-duplication is a technique to improve storage efficiency by identifying identical data and storing identical data only once. Data de-duplication is performed in storage systems such as EMC Data Domain and IBM ProtecTIER virtual tape libraries and NAS systems. However, data de-duplication techniques need improvements in order to satisfy and maintains the quality of service (QoS) requirements in term of resource utilization.

SUMMARY

It is an objective of embodiments of the invention to provide for an improved method, a computer system, and a computer program product. The objective is solved by the subject matter of the independent claims. Advantageous embodiments are described in the dependent claims.

In one illustrative embodiment, a computer implemented method is provided for data access in a storage infrastructure. In the illustrative embodiment, the storage infrastructure comprises a host system connected to at least a first storage system and a second storage system. In the illustrative embodiment, the storage infrastructure further comprises a de-duplication module maintaining a data structure comprising one or more entries, each entry of the one or more entries comprising a hash value, a data location, an identifier, a first usage count and a second usage count for a data chunk. In the illustrative embodiment, the first usage count and the second usage count are associated with the first storage system and the second storage system, respectively. In the illustrative embodiment, the first storage system and the second storage system comprise a first reference table and a second reference table, respectively. The illustrative embodiment receives, by the first storage system from the host system, a write request for storing the data chunk, the write request indicative of a first identifier of the data chunk. The illustrative embodiment calculates, by the first storage system, a hash value of the data chunk using a hash function. The illustrative embodiment determines, by the first storage system, a first storage location in the first storage system of the data chunk. The illustrative embodiment sends, by the first storage system, a write message including the hash value, the first identifier and the first storage location to the de-duplication module. The illustrative embodiment determines, by the de-duplication module, whether the hash value exists in the data structure. Responsive to the hash value existing in the data structure, the illustrative embodiment increments, by the de-duplication module, the first usage count of the data chunk. Responsive to the hash value failing to exist in the data structure, the illustrative embodiment adds, by the de-duplication module, an entry to the data structure comprising the hash value, the first storage location, the first identifier, the first usage count set to one and the second usage count set to zero. The illustrative embodiment receives a response message from the de-duplication module. In the illustrative embodiment, responsive to the hash value existing in the data structure, the response message comprises a second storage location, a second identifier, the first usage count and the second usage count associated with the hash value. Responsive to a determination that the first usage count is higher than a predetermined maximum usage value, the illustrative embodiment stores, by the first storage system, the data chunk in the first storage location, thereby duplicating the data chunk and adding an entry in the first reference table including the first identifier and the first storage location. Responsive to a determination that the first usage count fails to be higher than the predetermined maximum usage value, the illustrative embodiment adds, by the first storage system, an entry in the first reference table with the first identifier, the second storage location and the second identifier. Responsive to the hash value failing to exist in the data structure, the response message comprises instructions for storing the data chunk in the first storage location and the illustrative embodiment stores, by the first storage system, the data chunk in the first storage location and adding an entry in the first reference table including the first identifier and the first storage location.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

In the following, preferred embodiments of the invention will be described in greater detail by way of example only making reference to the drawings in which:

FIG. 3 is a flowchart of a method for reading a data chunk from a storage system; and FIG. 4 is a flowchart of a method for deleting a data chunk from a storage system.

DETAILED DESCRIPTION

Figure 1:
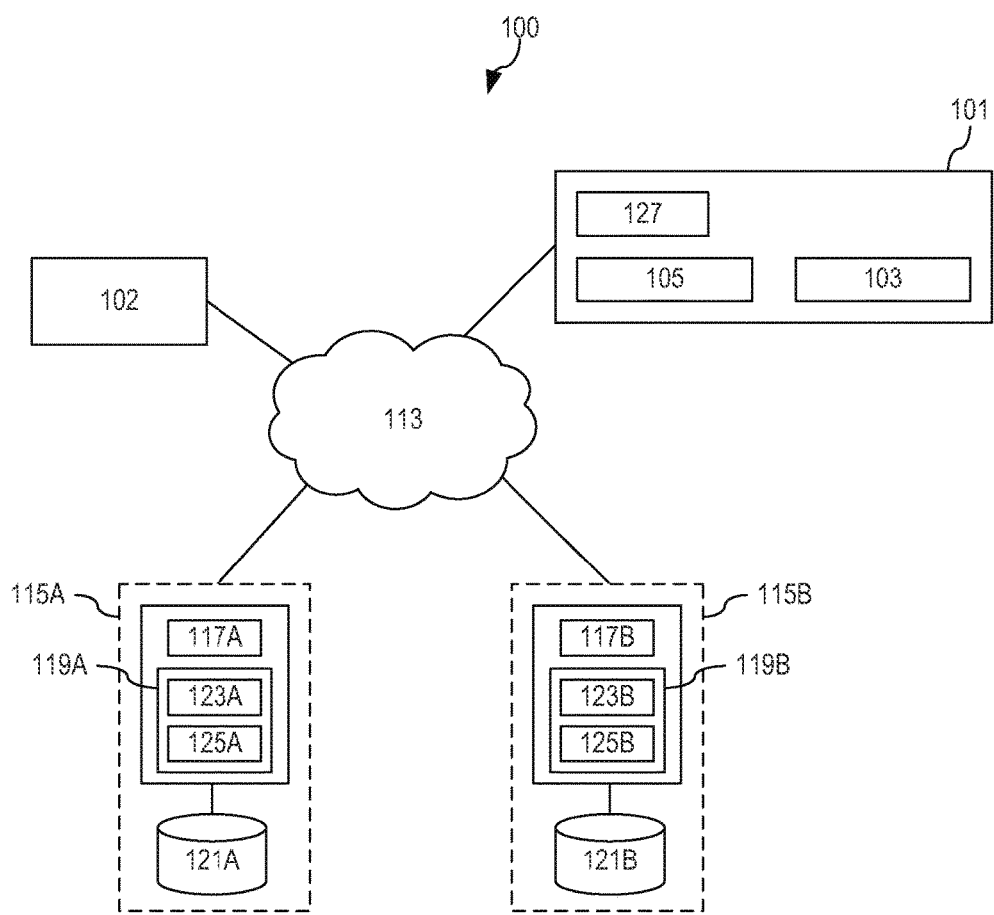
FIG. 1 depicts exemplary system architecture for data de-duplication.

The illustrative embodiment provide for data access in a storage infrastructure. The storage infrastructure comprises a host system connected to at least a first and second storage system. The storage infrastructure further comprises a de-duplication module maintaining a data structure comprising one or more entries. Each entry in the one or more entries comprises a hash value, a data location, an identifier, a first usage count, and a second usage count for a data chunk. The first and second usage counts are associated with the first and second storage systems, respectively, and the first and second storage systems comprise a first and a second reference table, respectively. In the illustrative embodiment, the first storage system from the host system receives a write request for storing a data chunk, where the write request is indicative of a first identifier of the data chunk. The first storage system calculates a hash value of the received data chunk using a hash function. The first storage system determines a first storage location in the first storage system of the received data chunk. The first storage system then sends a write message including the hash value, the first identifier, and the first storage location to the de-duplication module. The de-duplication module determines if the hash value exists in the data structure. If the hash value exists, the de-duplication module increments the first usage count of the data chunk. If the hash value does not exist, the de-duplication module adds an entry to the data structure comprising the hash value the first storage location, the first identifier, the first usage count set to one, and the second usage count set to zero. A response message is received from the de-duplication module, where in case the hash value exists in the data structure, the response message comprises a second storage location, a second identifier, the first usage count, and the second usage count associated with the hash value. In response to a determination that the first usage count is higher than a predetermined maximum usage value, the first storage system stores the data chunk in the first storage location, thereby duplicating the data chunk and adding an entry in the first reference table including the first identifier and the first storage location. In response to a determination that the first usage count fails to be higher than a predetermined maximum usage value, the first storage system adds an entry in the first reference table with the first identifier, the second storage location, and the second identifier. In case the hash value does not exist in the data structure, the response message comprises instructions for storing the data chunk in the first storage location. The first storage system stores the data chunk and adds an entry in the first reference table including the first identifier and the first storage location.

The term "data chunk" as used herein refers to the smallest unit of information within a data object that is transmitted between the sender and receiver of the data object. The characteristics of the unit of information may depend on the transmission protocol e.g. Stream Control Transmission Protocol (SCTP), Transmission Control Protocol (TCP), etc. being in use. The data chunk consists of a chunk header and chunk-specific data content. The chunk header may comprise, for example, metadata describing to which position of the data object the data chunk belongs to. A plurality of data chunks form a data object. A data object may be a file stored in a file system, a block stored in a block storage system such as a disk, a DVD or tape, or may be a data stream transmitted over a network. The data object may be an SCTP packet. The data object may be transmitted as a sequence of the plurality of data chunks.

The term "usage count" as used herein refers to a number of write access requests for writing a data chunk in a storage system.

The maximum usage value may be determined using an empirical analysis on a storage system by: providing a set of metrics comprising each a respective performance characteristic for the storage system; and evaluating at least one of the set of metrics for different number of write access to the storage system. The performance characteristic may comprise one of an I/O response time, I/O throughput and a combination thereof. The maximum usage value may be, for example, the number of write requests for which the evaluated I/O response time reaches an upper limit response time.

The upper limit response time may be, for example, predefined based on a service level agreement between the users of the storage system and the provider of the storage system.

These features may be advantageous as they may increase the storage performance of the storage infrastructure while maintaining a continuous and QoS-guaranteed service provided by the system architecture. This may prevent de-duplication of data to the detriment of the QoS.

Another advantage may be that the de-duplication of data may save disk space that is used for storing duplicate copies of data chunks.

Another advantage may be preventing storage system congestion by sharing access between the storage systems containing two or more copies of over-requested data chunks.

Another advantage may be provided in that that the present method may be a prior-storage de-duplication method which acts before the data is duplicated. This is in contrast to a post-storage de-duplication method which only acts when the files are already duplicated on the storage systems.

The illustrative embodiment further comprises for, after determining the first storage location and before sending the write message, storing the data chunk in the determined first storage location and adding an entry to the first reference table including the first identifier and the first storage location, where the sending of the write message is performed after a predefined time period. In case the hash value exists in the data structure, the response message further indicating instructions to delete the data chunk stored in the first storage location. The stored data chunk is then deleted from the first storage system.

The predefined time period may be for example an average time period or duration during which a user of the data chunk is usually connected to the storage infrastructure. For example, the user may request to write a data chunk into the first storage system. The user may thus expect a certain response time of the first storage system when further using the data chunk e.g. for reading during that time period. However, the de-duplication may result into a redirect of the user request to access his or her data chunk to another storage system which may increase his or her expected response time during that time period. This is why deferring the de-duplication to after the time period is ended may satisfy the user needs while he or she is still connecting to the storage system. This may increase the service quality of the system provided to the users.

In case the hash value exists in the data structure, the illustrative embodiment further comprises, in response to a determination that the first usage count is higher than the second usage count and if the first usage count is lower or equal to the predetermined maximum usage value, sending a request to the de-duplication module for moving the data chunk from the second storage system including the second storage location to the first storage location. The de-duplication module adds an entry in the data structure including the first identifier and the first storage location. The first storage system adds an entry in the first reference table including the first identifier and the first storage location. The second storage system adds an entry in the second reference table indicating the first storage location, the first identifier and the second identifier.

This may reduce the response time of the storage infrastructure to subsequent user requests of the data chunk. This is because, the time required to redirect a user request to use his/her stored data chunk to the second storage system may be saved.

The illustrative embodiment further comprises the first storage system receiving a read request for reading the data chunk having the first identifier. The first storage system determines that the first identifier exists in association with the second storage location in the first reference table and responsive to this sending to the second storage system that includes the second storage location, a request including the second storage location and the second identifier for obtaining the data chunk from the second storage system to satisfy the read request. The first storage system determines using the first reference table that the first identifier exists in association with the first storage location and that the first storage location is in the first storage system and responsive to this reading the data chunk from the first storage location of the first storage system. The first storage system sends the data chunk read to the host system.

The illustrative embodiment further comprises the first storage system receiving from the host system a delete request for deleting the data chunk having the first identifier, wherein the data chunk is stored in the first storage location. The first storage system sends a delete message to the de-duplication module including the first storage location and the first identifier of the data chunk. The de-duplication module decrements the first usage count. The first storage system receives a response message from the de-duplication module indicating the decremented first usage count and the second usage count of the data chunk. The first storage system determines that the first usage count is lower or equal than a preset minimum usage count and the second usage count is lower or equal than the preset minimum usage count and responsive to this deleting the data chunk from the first storage system. The first storage system sends a request to the second storage system for deleting an entry in the second reference table associated with the data chunk. The first storage system sends a request to the de-duplication module for deleting an entry in the data structure associated with the data chunk.

According to one embodiment, the minimum usage count is equal to zero.

These embodiments may be advantageous as they may maintain the continuous quality of service provided to the users, by for example, only deleting the data chunks when there is almost zero access to those data chunks. This may further save disk space.

The illustrative embodiment further comprises the first storage system receiving from the host system a delete request for deleting the data chunk, wherein the data chunk is stored in the second storage location. The first storage system determines that the first usage count is equal to zero. Responsive to this, the first storage system deletes an entry of the first reference table comprising the first identifier.

The illustrative embodiment further comprises the first storage system determines that the first usage count is different from zero and the second usage count is equal to zero and, responsive to this, sends a request to the de-duplication module for moving the data chunk from the second storage system including the second storage location to the first storage location; and adding an entry in the first reference table including the first identifier and the first storage location. This may further comprise deleting from the second reference table the entry that contains the second identifier and the second storage location.

This embodiment may be advantageous as it may reduce the response time of user's requests to the first storage system for accessing the data chunk previously stored in the second storage system, as the requests may not be redirected anymore. This may further save disk space.

In another aspect, the invention relates to a computer program product comprising computer executable instructions to perform the method steps of the method of any one of the preceding claims.

In the following, like numbered elements in the figures either designate similar elements or designate elements that perform an equivalent function. Elements which have been discussed previously will not necessarily be discussed in later figures if the function is equivalent.

The present disclosure addresses the shortcoming of the local de-duplication methods for which local de-duplication modules of two or more storage systems keep their own hash tables. Thus, data stored in one storage system which is identical to data stored in another storage system is stored twice since the de-duplication is done locally. The present disclosure discloses a novel centralized de-duplication module which keeps a centralized hash table for all storage systems performing de-duplication. The centralized hash table includes usage counts for data stored in the storage systems. The usage counts are used to decide where the data chunks are stored in order to guarantee reasonable access to the data as described in the following figures.

FIG. 1 depicts exemplary system architecture 100 for data de-duplication. The system architecture 100 provides a host system 102, a de-duplication module 101, and at least two storage 115A, 115B. The host system 102 and the de-duplication module 101 may be connected to each other and to the storage systems 115A-115B via a network 113, which may be a public network, such as the Internet, a private network, such as a wide area network (WAN), or a combination thereof.

The storage systems 115A-115B may store data in data storage devices 121A-121B. The storage systems 115A-115B may be included in a parallel network and coordinated by a network protocol. Each storage system of the storage systems 115A-115B has its own CPU 117A, 117B, in operative combination with its memory 119A, 119B and storage device 121A, 121B respectively. The memories 119A and 119B comprise respectively a first and second hash module 123A and 123B. Hash module 123 when executed by the CPU 117 may calculate using a hash function a hash value of received data chunks.

The data contained in the storage devices 121A-121B is retrievable by the host system 102 by means of a query to the storages systems 115A-115B respectively. The host system 102 may also store data in the storage devices 121A-121B.

The data to be stored in the storage devices 121A-121B may be transmitted as a sequence of data chunks forming a data object.

The storage systems 115A-115B may be block based storage systems and/or file based storage systems. Each of the storages systems 115A-115B may operate like an independent system running its own operating environment.

The components of de-duplication module 101 may include, but are not limited to, one or more processors or processing units 103 and a system memory 105.

The de-duplication module 101 and storage systems 115 may be implemented in separate machines, or may be implemented as separate processes in a single machine.

The de-duplication module 101 may act as a coordinator for de-duplicating data to be stored in the storage devices 121A-121D. For that end, the de-duplication module 101 maintains a data structure 127 comprising one or more entries. Each entry comprises a hash value, a data location, an identifier, a first usage count and a second usage count for a data chunk that is already stored in one of the storage systems it 115A, 115B. The first and second usage counts define the number of write request of a given data chunk received at the first and second storage systems 115A-115B respectively. A simplified content of the data structure 127 is shown in the following table 1.

| hash value | storage system | storage location | identifier | 1$^{st}$ usage count | 2$^{nd}$ usage count |
|---|---|---|---|---|---|
| 1000000 | 115A | LUN-2, 0x50 | block 150 | 3 | 5 |
| 2000000 | 115B | /filesystem/directory | file1 | 1 | 2 |

The data structure 127 keeps track of hash values calculated for data chunks by hash modules 123A and 123B. Each hash value (column 1) is associated with a storage system (column 2) and a storage location within this storage system (column 3) of the data chunk which is identified by an identifier (column 4) and the usage counts (column 5 and 6). The data chunk is the only instance of a data chunk having this hash value (column 1). The storage system (column 2) is one of storage systems 115A-115B. The storage location (column 3) is the actual block address or directory path where the data chunk is stored. The identifier (column 4) may be for example the name of the data object to which the data chunk belongs. The name may also indicate the position of the data chunk within the data object.

Referring to row 2 of table 1, the data chunk with identifier "block150" (column 4) is stored in storage system 115A (column 2) and the storage location is logical unit number with the name "LUN-2" at block 0x50 (column 3). The data chunk has the hash value of 1000000 (column 1) and is referenced (or requested for writing) 3 times in the storage system 115A and 5 times in the storage system 115B (column 5). Row 2 of table 1 gives an example for a data chunk which is stored in a block based storage system. Row 3 of table it gives an example for a data chunk which is stored in a file based storage system. The data chunk with the name "file1" (column 4) is stored in storage system 115B (column 2) in the storage location denoted by path file/system/directory (column 3). The data chunk has the hash value of 2000000 (column 1) and is referenced a single time in the storage system 115A and 2 times in the storage system 115B (column 5).

The data structure 127 described above may be used by the de-duplication module 101 to check whether a received data chunk exists or not in the storage systems. The de-duplication module may also update the content of the data structure 127 depending on the received data.

The storage systems 115A and 115B include local reference tables 125A and 125B respectively. In the local reference table, each hash module 123A, 123B keeps track of the data chunks which are identical to other data chunks that are stored in other storage systems 115A, 115B as well as data chunks being stored locally in the storage device 121A, 121B.

The following table 2 shows a simplified example of the local reference table 125A of storage system 115A in accordance to the example of the table 1:

| first identifier (local) | Storage location | second identifier |
|---|---|---|
| file2 | 115B, /filesystem/directory | file1 |
| Block 150 | 115A, LUN-2, 0x50 | — |

The local reference table 2 comprises the first identifier (column 1) for a data chunk which has been written to the storage system (115A) and which is identical to a data chunk stored in the other storage system 115B (column 2) under a second identifier (column 3).

Referring to row 2: the first identifier of the data chunk is "file2" (column 1). This data chunk is stored in storage system it 115B under the path /filesystem/directory (column 2) where it has the name "file1" (column 3). Thus, the data identifier with ID "file2" (column 1) which was written to storage system 115A is identical to data chunk "file1" (column 3) which is stored in storage system 115B at the storage location filesystem/directory (column 2 and 3). "file2" refers for example to the data object name to which the data chunk belongs, wherein the number 2 refers to the position (second) of the data chunk within the data object.

Referring to row 3: the first identifier of the data chunk is "block 150" (column 1). This data chunk is stored locally in storage system 115A at storage location LUN-2 block address 0x50 (column 2).

The following table 3 shows a simplified example of the local reference table 125B of storage system 115B in accordance to the example of the table 1:

| first identifier (local) | Storage location | second identifier |
|---|---|---|
| block3 | 115A, LUN-2, 0x50 | block150 |
| file 1 | 115B/filesystem/directory | — |

The local reference table 3 comprises the first identifier (column 1) (or/a data chunk which has been written to the storage system 115B and which is identical to an object stored in the other storage system 115A (column 2) under a second identifier (column 3).

Referring to row 2: the first identifier of the data chunk is "block3" (column 1). This data chunk is stored in storage system 115A at LUN-2 and block address 0x50 under (column 2) where it has the name "block150" (column 3). Thus the data chunk with ID "block3" (column 1) which was written to storage system 115B is identical to data chunk "block150" (column 3) which is stored in storage system 115A at the storage location LUN-2 block address 0x50 (column 2 and 3).

Referring to row 3: the first identifier of the data chunk is "file1" (column 1). This data chunk is stored locally in storage system 115B under the path /filesystem/directory (column 2).

For simplicity of the description, only two storage systems are described; however, the skilled in the art will easily understand that the present method may be generalized to more than two storage systems.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The operation of the system architecture 100 will be described in details with reference to FIG. 2-FIG. 4.

Figure 2:
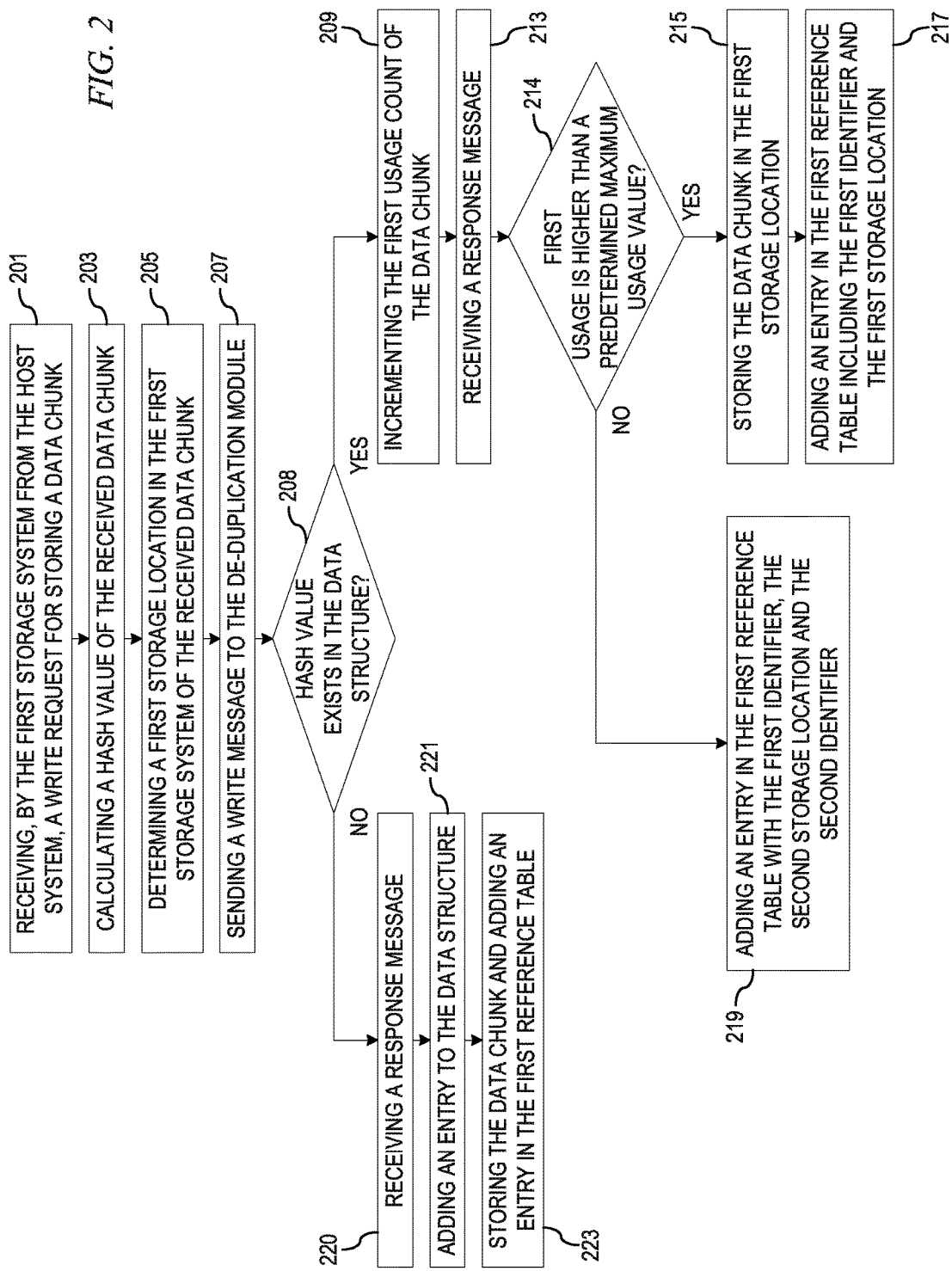
FIG. 2 is a flowchart of a method for data access in a storage infrastructure.

FIG. 2 is a flowchart of a method for data access in a storage infrastructure such as storage infrastructure 100.

In step 201, the storage system 115A may receive from the host system 102, a write request for storing a data chunk, wherein the write request is indicative of a first identifier of the data chunk. The first identifier may be for example a file name of a data object comprising the data chunk which also indicates the position of the data chunk within the data object.

In step 203, the storage system 115A calculates a hash value of the received data chunk using a hash function. The hash function may be, for example, an MD5, SHA-1, or SHA-256 hash function. The hash value may be a "digital fingerprint" of the data chunk and uniquely identifies it.

In step 205, the storage system 115A determines a first storage location in the storage system 115A of the received data chunk.

In step 207, the storage system 115A sends a write message including the hash value, the first identifier and the first storage location to the de-duplication module 101.

The de-duplication module 101 determines in step 208 if the hash value exists in the data structure; and if the hash value exists in the data structure (e.g. table 1) the de-duplication module 101 increments the first usage count of the data chunk in step 209.

The first and second usage count may be initialized to zero for a given data chunk. When a write request of that given data chunk is received e.g. from the storage system 115A as in step 207, the de-duplication module 101 may increment the first usage count which is associated with the storage system 115A by one.

In step 213, the storage system 115A receives a response message from the de-duplication module 101. In case the hash value exists in the data structure 127, the response message comprises a second storage location, a second identifier, the first usage count and the second usage count associated with the hash value. This means that the data chunk that is received for writing in the first storage system 115A exists in one of the storage systems 115A or 115B, in the second storage location and having a second identifier.

In response to a determination that the first usage count is higher than a predetermined maximum usage value, in step 214, the storage system 115A stores, in step 215, the data chunk in the first storage location. This may create a second copy of the data chunk in the storage system 115A. The predetermined maximum usage value may indicate the upper limit of write request that may lead to storage system congestion. The predetermined maximum usage value may be estimated using simulation based on a model of the system architecture 100 described above. This may have the advantage of preventing storage system congestion by sharing access between the storage systems containing two or more copies of the received data chunk.

In step 217, the storage system 115A adds an entry in a first reference table (e.g. table 2) of the storage system 115A including the first identifier and the first storage location. If the first usage count is smaller or equal to the predetermined maximum usage value, in step 214, the storage system 115A adds, in step 219, an entry in the first reference table with the first identifier, the second storage location and the second identifier. This may add reference or pointer to the second storage location since the storage system 115A does not store the data chunk locally when the first usage count is smaller or equal to the predetermined maximum usage value.

In case it is determined by the de-duplication module 101, in step 208, that the hash value does not exist in the data structure 127, the response message comprising instructions for storing the data chunk in the first storage location is received in step 220. The de-duplication module 101 adds an entry to the data structure (table 1) comprising the hash value, the first storage location, the first identifier, the first usage count set to one and the second usage count set to zero, in step 221. In step 223, the storage system 115A stores locally the data chunk and adds an entry in the first reference table including the first identifier and the first storage location.

FIG. 3 is a flowchart of a method for reading a data chunk from a storage system e.g. of system architecture 100.

In step 301, the storage system 115A receives a read request for reading a data chunk having a first identifier. The request my be received from the host system 102.

In step 307, the storage system 115A determines using the first reference table (e.g. table 1) that the first identifier fails to exist in association with the first storage location but, in step 303, the storage system 115A determines that the first identifier exists in association with the second storage location and the second identifier in the first reference table. For example, the storage system 115A may read the local reference table 2, and selects the entry or record having an identifier that is identical to the first identifier. Next, the storage system 115A, may read the content of the columns of the selected record to determine whether the data chunk that is requested for reading is stored locally or in other storage systems e.g. storage system 115B. This may be done by reading the location of the data chunk stored in the cell defined by the second column of table 2 and the selected record and therefrom the storage system 115A may determine that the data chunk is stored in the storage system 115B.

If at step 303 the first identifier exists in association with the second storage location and the second identifier in the first reference table, then, in step 305, the storage system 115A sends to the storage system 115B a request that includes the second storage location and the second identifier for obtaining the data chunk from the storage system 115B. The request indicates the second storage location and the second identifier for obtaining the data chunk from the storage system 115B in step 306. This may be done for example, via the de-duplication module 101. That is, the storage system 115A may request the data chunk to the de-duplication module 101 which in turn forwards the request to the storage system 115B. Alternatively, the storage system 115A may have a direct connection to the storage system 115B, and may thus send the request directly to the storage system 115B. The storage system 115B may then send the data chunk either directly to the host system 102 or to the storage system 115A. If at step 303 the first identifier fails to exist in association with the second storage location and the second identifier in the first reference table, then, at step 313 an error is sent indicating the data chunk is unable to be read.

In step 307, the storage system 115A determines using the first reference table (e.g. table 1) that the first identifier exists in association with the first storage location and that the first storage location is in the first storage system, and responsive to this, the storage system 115A reads, in step 309, the data chunk from the first storage location of the storage system 115A.

Finally, in step 311, the storage system 115A sends the data chunk read to the host system 102.

FIG. 4 is a flowchart of a method for deleting a data chunk from a storage system e.g. of system architecture 100.

In step 401, the storage system 115A receives from the host system 102 a delete request for deleting the data chunk having the first identifier.

In case it is determined in step 402 that the data chunk is stored in the storage system 115A, then, in step 403, the storage system 115A sends a delete message to the de-duplication module 101 including the first storage location and the first identifier of the data chunk.

In step 405, the de-duplication module 101 decrements e.g. by one the first usage count that is associated with the data chunk to be deleted. Since the data chunk is already stored in the storage system 115A, an entry for that data chunk may exist in the data structure (e.g. table 1) of the de-duplication module 101.

In step 407, the storage system 115A receives a response message from the de-duplication module 101 indicating the decremented first usage count and the second usage count of the data chunk.

In step 409, the storage system 115A determines that the first usage count is lower or equal than a preset minimum usage count and the second usage count is lower or equal than the preset minimum usage count. For example, the preset minimum usage count may be equal to zero. In this case, the data chunk is not accessed for writing anymore by any users or host systems. Alternatively, the minimum usage count may be defined by an administrator of the system architecture 100. The administrator may define, for example, the minimum usage count as equal to 1% of the users of the system architecture 100; which value indicates that the data chunk is not of high relevance for most of the users.

If at step 409 the storage system 115A determines that the first usage count is lower or equal than a preset minimum usage count and the second usage count is lower or equal than the preset minimum usage count, then, in step 411, the storage system 115A deletes the data chunk from the first storage location.

In addition, the storage system 115A sends in step 412 a request to the storage system 115B for deleting an entry in the second reference table associated with the deleted data chunk, such that no reference to the deleted data chunk is kept and sends a request to the de-duplication module for deleting an entry in the data structure associated with the data chunk (i.e. identified by the first storage location and the first identifier).

If at step 409 the storage system 115A determines that the first usage count fails to be lower or equal than a preset minimum usage count and the second usage count fails to be lower or equal than the preset minimum usage count, then, at step 408, the data chunk is not deleted.

In case it is determined in step 402 that the data chunk fails to be stored in the storage system 115A, then, in step 404 it is determined whether the data chunk is stored in the storage system 115B. In case it is determined in step 404 that the data chunk is stored in the storage system 115B, then, in step 413, the storage system 115A determines whether the first usage count is equal to zero. If at step 413 the storage system 115A determines that the first usage count is equal to zero, an entry of the first reference table comprising the first identifier is deleted in step 414.

If at step 413 the first usage count is different from zero and, at step 416, the second usage count is equal to zero, the storage system 115A sends, in step 415, a request to the de-duplication module 101 for moving the data chunk from the second storage system 115B including the second storage location to the first storage location, and updating an entry in the data structure 127 associated with the data chunk to indicate that the data chunk is stored in the storage system 115A. In step 417, the storage system adds an entry in the first reference table including the first identifier and the first storage location. If at step 416 the second usage count fails to be equal to zero, then, at step 418, the data chunk is not deleted. In case it is determined in step 404 that the data chunk fails to be stored in the storage system 115B, then, at step 419, an error is sent indicating the data chunk is unable to be deleted since it does not exist in the storage system 115A or the storage system 115B.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

The invention claimed is:

1. A computer implemented method for data access in a storage infrastructure, the storage infrastructure comprising a host system connected to at least a first storage system and a second storage system, the storage infrastructure further comprising a de-duplication module maintaining a data structure comprising one or more entries, each entry of the one or more entries comprising a hash value, a data location, an identifier, a first usage count and a second usage count for a data chunk, wherein the first usage count and the second usage count are associated with the first storage system and the second storage system, respectively, the first storage system and the second storage system comprising a first reference table and a second reference table, respectively, the method comprising:

receiving, by the first storage system from the host system, a write request for storing the data chunk, wherein the write request is indicative of a first identifier of the data chunk;

calculating, by the first storage system, a hash value of the data chunk using a hash function;

determining, by the first storage system, a first storage location for the data chunk in the first storage system;

sending, by the first storage system, a write message including the hash value, the first identifier and the first storage location to the de-duplication module;

determining, by the de-duplication module, whether the hash value exists in the data structure;

responsive to the hash value existing in the data structure, incrementing, by the de-duplication module, the first usage count of the data chunk;

responsive to the hash value failing to exist in the data structure, adding, by the de-duplication module, an entry to the data structure comprising the hash value, the first storage location, the first identifier, the first usage count set to one and the second usage count set to zero;

receiving, by the first storage system, a response message from the de-duplication module, wherein:

responsive to the hash value existing in the data structure, the response message comprising a second storage location, a second identifier, the first usage count and the second usage count associated with the hash value and wherein:

responsive to a determination that the first usage count is higher than a predetermined maximum usage value, storing, by the first storage system, the data chunk in the first storage location, thereby duplicating the data chunk and adding an entry in the first reference table including the first identifier and the first storage location, and responsive to a determination that the first usage count fails to be higher than the predetermined maximum usage value, adding, by the first storage system, an entry in the first reference table with the first identifier, the second storage location and the second identifier; and responsive to the hash value failing to exist in the data structure, the response message comprises instructions for storing the data chunk in the first storage location and storing, by the first storage system, the data chunk in the first storage location and adding an entry in the first reference table including the first identifier and the first storage location.

2. The method of claim 1, further comprising:

after determining the first storage location and before sending the write message, storing, by the first storage system, the data chunk in the determined first storage location and adding an entry to the first reference table including the first identifier and the first storage location, wherein the sending of the write message is performed after a predefined time period; and responsive to the hash value existing in the data structure, the response message further indicating instructions to delete the data chunk stored in the first storage location, deleting, by the first storage system, the data chunk from the first storage system.

3. The method of claim 1, wherein, responsive to the hash value existing in the data structure, the method further comprising:

responsive to a determination that the first usage count is higher than the second usage count and responsive to the first usage count being lower than or equal to the predetermined maximum usage value:

sending, by the first storage system, a request to the de-duplication module for moving the data chunk from the second storage location in the second storage system to the first storage location, adding, by the de-duplication module, an entry in the data structure including the first identifier and the first storage location, adding, by the first storage system, an entry in the first reference table including the first identifier and the first storage location, and adding, by the second storage system, an entry in the second reference table indicating the first storage location, the first identifier and the second identifier.

4. The method of claim 1, further comprising:

receiving, by the first storage system, a read request for reading the data chunk having the first identifier;

determining, by the first storage system, whether the first identifier exists in association with the second storage location in the first reference table and responsive to determining that the first identifier exists in association with the second storage location in the first reference table, sending to the second storage system that includes the second storage location, a request including the second storage location and the second identifier for obtaining the data chunk from the second storage system;

determining, by the first storage system, using the first reference table whether the first identifier exists in association with the first storage location and whether the first storage location is in the first storage system and responsive to determining that the first identifier exists in association with the first storage location and that the first storage location is in the first storage system, reading the data chunk from the first storage location of the first storage system; and sending, by the first storage system, the data chunk to the host system.

5. The method of claim 1, further comprising:

receiving, by the first storage system, from the host system a delete request for deleting the data chunk having the first identifier, wherein the data chunk is stored in the first storage location;

sending, by the first storage system, a delete message to the de-duplication module including the first storage location and the first identifier of the data chunk;

decrementing, by the de-duplication module, the first usage count;

receiving, by the first storage system, a response message from the de-duplication module indicating the decremented first usage count and the second usage count of the data chunk;

determining, by the first storage system, whether the first usage count is lower than or equal to a preset minimum usage count and the second usage count is lower than or equal to than the preset minimum usage count;

responsive to the first usage count being lower than or equal to the preset minimum usage count and the second usage count being lower than or equal to the preset minimum usage count, deleting, by the first storage system, the data chunk from the first storage system;

sending, by the first storage system, a request to the second storage system for deleting an entry in the second reference table associated with the data chunk; and sending, by the first storage system, a request to the de-duplication module for deleting an entry in the data structure associated with the data chunk.

6. The method of claim 5, wherein the minimum usage count is equal to zero.

7. The method of claim 1, further comprising:

receiving, by the first storage system, from the host system a delete request for deleting the data chunk, wherein the data chunk is stored in the second storage location;

determining, by the first storage system, whether the first usage count is equal to zero; and responsive to the first usage count being equal to zero, deleting, by the first storage system, an entry of the first reference table comprising the first identifier.

8. The method of claim 7, further comprising:

determining, by the first storage system, whether the first usage count is greater than zero and the second usage count is equal to zero; and responsive to the first usage count being greater than zero and the second usage count being equal to zero:

sending, by the first storage system, a request to the de-duplication module for moving the data chunk from the second storage location in the second storage system to the first storage location, updating, by the de-duplication module, an entry in the data structure associated with the data chunk to indicate that the data chunk is stored in the first storage system, and adding, by the first storage system, an entry in the first reference table including the first identifier and the first storage location.

9. A computer system comprising:

a first storage system comprising a physical processor and a physical memory coupled to the physical processor, and a de-duplication module further comprising a physical processor and a physical memory coupled to the physical processor, wherein the memories comprise instructions which, when executed by the physical processors, cause the physical processors to:
receive, by the first storage system, a write request for storing a data chunk, wherein the write request is indicative of a first identifier of the data chunk;
calculate, by the first storage system, a hash value of the data chunk using a hash function;
determine, by the first storage system, a first storage location for the data chunk in the first storage system;
send, by the first storage system, a write message including the hash value, the first identifier and the first storage location to the de-duplication module;
determine, by the de-duplication module, whether the hash value exists in a data structure;
responsive to the hash value existing in the data structure, increment, by the de-duplication module, a first usage count of the data chunk;
responsive to the hash value failing to exist in the data structure, add, by the de-duplication module, an entry to the data structure comprising the hash value, the first identifier, the first storage location, the first usage count set to one and a second usage count set to zero;
receive, by the first storage system, a response message from the de-duplication module, wherein:
responsive to the hash value existing in the data structure, the response message comprising a second storage location, a second identifier, the first usage count and the second usage count associated with the hash value and wherein:
responsive to a determination that the first usage count is higher than a predetermined maximum usage value, store, by the first storage system, the data chunk in the first storage location, thereby duplicating the data chunk and adding an entry in the first reference table including the first identifier and the first storage location, and
responsive to a determination that the first usage count fails to be higher than the predetermined maximum usage value, add, by the first storage system, an entry in the first reference table with the first identifier, the second storage location and the second identifier; and
responsive to the hash value failing to exist in the data structure, the response message comprises instructions for storing the data chunk in the first storage location and store, by the first storage system, the data chunk and adding an entry in the first reference table including the first identifier and the first storage location.

10. The computer system of claim 9, wherein the instructions further cause the physical processors to:
after determining the first storage location and before sending the write message, store, by the first storage system, the data chunk in the determined first storage location and adding an entry to the first reference table including the first identifier and the first storage location, wherein the sending of the write message is performed after a predefined time period; and
responsive to the hash value existing in the data structure, the response message further indicating instructions to delete the data chunk stored in the first storage location, delete, by the first storage system, the data chunk from the first storage system.

11. The computer system of claim 9, wherein, responsive to the hash value existing in the data structure, the instructions further cause the physical processors to:

responsive to a determination that the first usage count is higher than the second usage count and responsive to the first usage count being lower than or equal to the predetermined maximum usage value:
send, by the first storage system, a request to the de-duplication module for moving the data chunk from the second storage location in the second storage system to the first storage location,
add, by the de-duplication module, an entry in the data structure including the first identifier and the first storage location,
add, by the first storage system, an entry in the first reference table including the first identifier and the first storage location, and
add, by the second storage system, an entry in the second reference table indicating the first storage location, the first identifier and the second identifier.

12. The computer system of claim 9, wherein the instructions further cause the physical processors to:
receive, by the first storage system, a read request for reading the data chunk having the first identifier;
determine, by the first storage system, that the first identifier exists in association with the second storage location in the first reference table and, responsive to determining that the first identifier exists in association with the second storage location in the first reference table, sending to the second storage system that includes the second storage location, a request including the second storage location and the second identifier for obtaining the data chunk from the second storage system;
determine, by the first storage system, using the first reference table whether the first identifier exists in association with the first storage location and whether the first storage location is in the first storage system and responsive to determining that the first identifier exists in association with the first storage location and that the first storage location is in the first storage system, reading the data chunk from the first storage location of the first storage system; and
send, by the first storage system, the data chunk to the host system.

13. The computer system of claim 9, wherein the instructions further cause the physical processors to:
receive, by the first storage system, from the host system a delete request for deleting the data chunk having the first identifier, wherein the data chunk is stored in the first storage location;
send, by the first storage system, a delete message to the de-duplication module including the first storage location and the first identifier of the data chunk;
decrement, by the de-duplication module, the first usage count;
receive, by the first storage system, a response message from the de-duplication module indicating the decremented first usage count and the second usage count of the data chunk;
determine, by the first storage system, whether the first usage count is lower than or equal to a preset minimum usage count and the second usage count is lower than or equal to the preset minimum usage count;
responsive to the first usage count being lower than or equal to the preset minimum usage count and the second usage count being lower than or equal to the preset minimum usage count, delete, by the first storage system, the data chunk from the first storage system;

send, by the first storage system, a request to the second storage system for deleting an entry in the second reference table associated with the data chunk; and send, by the first storage system, a request to the de-duplication module for deleting an entry in the data structure associated with the data chunk.

14. The computer system of claim 9, wherein the instructions further cause the physical processors to:

receive, by the first storage system, from the host system a delete request for deleting the data chunk, wherein the data chunk is stored in the second storage location;

determine, by the first storage system, whether the first usage count is equal to zero; and responsive to the first usage count being equal to zero, delete, by the first storage system, an entry of the first reference table comprising the first identifier.

15. A computer program product comprising a non-transitory computer readable storage medium having a computer readable program stored therein, wherein the computer readable program, when executed in a first storage system or a de-duplication module, causes the first storage system or the de-duplication device to:

receive, by the first storage system, a write request for storing a data chunk, wherein the write request is indicative of a first identifier of the data chunk;

calculate, by the first storage system, a hash value of the data chunk using a hash function;

determine, by the first storage system, a first storage location for the data chunk in the first storage system;

send, by the first storage system, a write message including the hash value, a first identifier and the first storage location to the de-duplication module;

determine, by the de-duplication module, whether the hash value exists in a data structure;

responsive to the hash value existing in the data structure, increment, by the de-duplication module, a first usage count of the data chunk;

responsive to the hash value failing to exist in the data structure, add, by the de-duplication module, an entry to the data structure comprising the hash value, the first identifier, the first storage location, the first usage count set to one and a second usage count set to zero;

receive, by the first storage system, a response message from the de-duplication module, wherein:

responsive to the hash value existing in the data structure, the response message comprising a second storage location, a second identifier, the first usage count and the second usage count associated with the hash value and wherein:

responsive to a determination that the first usage count is higher than a predetermined maximum usage value, store, by the first storage system, the data chunk in the first storage location, thereby duplicating the data chunk and adding an entry in the first reference table including the first identifier and the first storage location, and responsive to a determination that the first usage count fails to be higher than the predetermined maximum usage value, add, by the first storage system, an entry in the first reference table with the first identifier, the second storage location and the second identifier; and responsive to the hash value failing to exist in the data structure, the response message comprises instructions for storing the data chunk in the first storage location and store, by the first storage system, the data chunk and adding an entry in the first reference table including the first identifier and the first storage location.

16. The computer program product of claim 15, wherein the computer readable program further causes the first storage system or the de-duplication device to:

after determining the first storage location and before sending the write message, store, by the first storage system, the data chunk in the determined first storage location and adding an entry to the first reference table including the first identifier and the first storage location, wherein the sending of the write message is performed after a predefined time period; and responsive to the hash value existing in the data structure, the response message further indicating instructions to delete the data chunk stored in the first storage location, delete, by the first storage system, the data chunk from the first storage system.

17. The computer program product of claim 15, wherein, responsive to the hash value existing in the data structure, the computer readable program further causes the first storage system or the de-duplication device to:

responsive to a determination that the first usage count is higher than the second usage count and responsive to the first usage count being lower than or equal to the predetermined maximum usage value:

send, by the first storage system, a request to the de-duplication module for moving the data chunk from the second storage location in the second storage system to the first storage location, add, by the de-duplication module, an entry in the data structure including the first identifier and the first storage location, add, by the first storage system, an entry in the first reference table including the first identifier and the first storage location, and add, by the second storage system, an entry in the second reference table indicating the first storage location, the first identifier and the second identifier.

18. The computer program product of claim 15, wherein the computer readable program further causes the first storage system or the de-duplication device to:

receive, by the first storage system, a read request for reading the data chunk having the first identifier;

determine, by the first storage system, that the first identifier exists in association with the second storage location in the first reference table and, responsive to determining that the first identifier exists in association with the second storage location in the first reference table, sending to the second storage system that includes the second storage location, a request including the second storage location and the second identifier for obtaining the data chunk from the second storage system;

determine, by the first storage system, using the first reference table whether the first identifier exists in association with the first storage location and whether the first storage location is in the first storage system and responsive to determining that the first identifier exists in association with the first storage location and that the first storage location is in the first store system, reading the data chunk from the first storage location of the first storage system; and send, by the first storage system, the data chunk to the host system.

19. The computer program product of claim 15, wherein the computer readable program further causes the first storage system or the de-duplication device to:
- receive, by the first storage system, from the host system a delete request for deleting the data chunk having the first identifier, wherein the data chunk is stored in the first storage location;
- send, by the first storage system, a delete message to the de-duplication module including the first storage location and the first identifier of the data chunk;
- decrement, by the de-duplication module, the first usage count;
- receive, by the first storage system, a response message from the de-duplication module indicating the decremented first usage count and the second usage count of the data chunk;
- determine, by the first storage system, whether the first usage count is lower than or equal to a preset minimum usage count and the second usage count is lower than or equal to the preset minimum usage count;
- responsive to the first usage count being lower than or equal to the preset minimum usage count and the second usage count being lower than or equal to the preset minimum usage count, delete, by the first storage system, the data chunk from the first storage system;
- send, by the first storage system, a request to the second storage system for deleting an entry in the second reference table associated with the data chunk; and
- send, by the first storage system, a request to the de-duplication module for deleting an entry in the data structure associated with the data chunk.

20. The computer program product of claim 15, wherein the computer readable program further causes the first storage system or the de-duplication device to:
- receive, by the first storage system, from the host system a delete request for deleting the data chunk, wherein the data chunk is stored in the second storage location;
- determine, by the first storage system, whether the first usage count is equal to zero; and
- responsive to the first usage count being equal to zero, delete, by the first storage system, an entry of the first reference table comprising the first identifier.

* * * * *